United States Patent
Winger (10) Patent No.: US 8,121,195 B2
(45) Date of Patent: Feb. 21, 2012

(54) MEMORY REDUCED H264/MPEG-4 AVC CODEC

(75) Inventor: Lowell L. Winger, Waterloo (CA)

(73) Assignee: LSI Corporation, Milpitas, CA (US)

( * ) Notice: Subject to any disclaimer, the term of this patent is extended or adjusted under 35 U.S.C. 154(b) by 1483 days.

(21) Appl. No.: 11/606,541

(22) Filed: Nov. 30, 2006

(65) Prior Publication Data

US 2008/0130754 A1 Jun. 5, 2008

(51) Int. Cl.
*H04N 11/04* (2006.01)
(52) U.S. Cl. .......... 375/240.21; 375/240.26; 375/240.01
(58) Field of Classification Search ............... 375/240.21
See application file for complete search history.

(56) References Cited

U.S. PATENT DOCUMENTS

| | | | |
|---|---|---|---|
| 5,923,815 A * | 7/1999 | Park | 386/329 |
| 7,430,238 B2 * | 9/2008 | Lin et al. | 375/240.16 |
| 2001/0011290 A1 | 8/2001 | Kovacevic et al. | 708/308 |
| 2004/0170330 A1 | 9/2004 | Fogg | 382/232 |
| 2005/0207498 A1 | 9/2005 | Vitali et al. | 375/240.16 |
| 2006/0188023 A1 | 8/2006 | Ju | 375/240.22 |
| 2006/0233258 A1 | 10/2006 | Holcomb | 375/240.21 |
| 2006/0245502 A1 | 11/2006 | Cheng et al. | 375/240.24 |

FOREIGN PATENT DOCUMENTS

EP  536721 A2 *  4/1993

* cited by examiner

*Primary Examiner* — Christopher S Kelley
*Assistant Examiner* — Jonathan Torchman
(74) *Attorney, Agent, or Firm* — Christopher P. Maiorana, PC (57) ABSTRACT

A method for reducing memory utilization in a digital video codec. The method generally includes the steps of (A) generating a second reference picture by downsampling a first reference picture using a pattern, wherein the pattern (i) comprises a two-dimensional grid and (ii) is unachievable by performing a vertical downsampling and separately performing a horizontal downsampling, (B) generating a third reference picture by upsampling the second reference picture and (C) processing an image in a video signal using the third reference picture.

9 Claims, 8 Drawing Sheets

FIG. 1
(CONVENTIONAL)

FIG. 2

(CONVENTIONAL)

FIG. 3

FIG. 4
(CONVENTIONAL)

MEMORY REDUCED H264/MPEG-4 AVC CODEC

FIELD OF THE INVENTION

The present invention relates to video coding/decoding/transcoding (codecs) generally and, more particularly, to a memory reduced H.264/MPEG-4 AVC codec.

BACKGROUND OF THE INVENTION

An International Telecommunication Union-Telecommunication Standardization Sector (ITU-T) recommendation H.264 and an International Organization for Standardization/International Electrotechnical Commission (ISO/IEC) recommendation MPEG-4 Part 10 for Advanced Video Coding (MPEG-4/AVC) concern digital video codecs. The H.264 |MPEG-4/AVC documents (hereafter simply referred to as H.264) specify both decoder operation (semantics) and compressed video representation (bitstream syntax). Due to efficient syntax and many new predictive options, a conventional H.264 video encoder produces bitstreams that provide MPEG-2 quality with a 50% lower bitrate. As such, video distribution channels such as high definition digital optical media formats (Blu-ray Disc™, HD DVD), cable (High Definition Video On Demand), satellite (DirectTV, DISH Networks™), Internet Protocol Television (IPTV), terrestrial high definition television (TV), pay TV (France, England) and mobile systems (3GPP) are deploying H.264 capable equipment. Blue-Ray is a trademark of the Blu-ray Disc Association, Tokyo, Japan. DISH Network is a registered trademark of EchoStar Satellite L.L.C., Englewood, Colo.

Two classes of predictions are used in ISO/IEC and ITU block-based hybrid predictions and transform video codecs. Inter-frame predictions and intra-frame predictions are used to remove redundancy, such that improved compression is possible. Inter-frame predictions use previously, sometimes motion compensated, decoded video frames or fields for prediction of current blocks. (Predictive) P-blocks use only one block from a previous frame or field to predict. (Bi-predictive) B-blocks use a (potentially weighted) average of predictions from two previously decoded blocks. In contrast, intra-frame predictions use previously decoded adjacent blocks within the current field or frame. Key-frames that exclusively use intra-frame predictions (i.e., I-frames) may be used as access points into a compressed bitstream for channel changes or error recovery. Intra-predictions have a significant effect upon how mismatches from approximations or errors accumulate in video and, therefore, upon the effectiveness of different approximation based memory reduction techniques.

Figure 1:
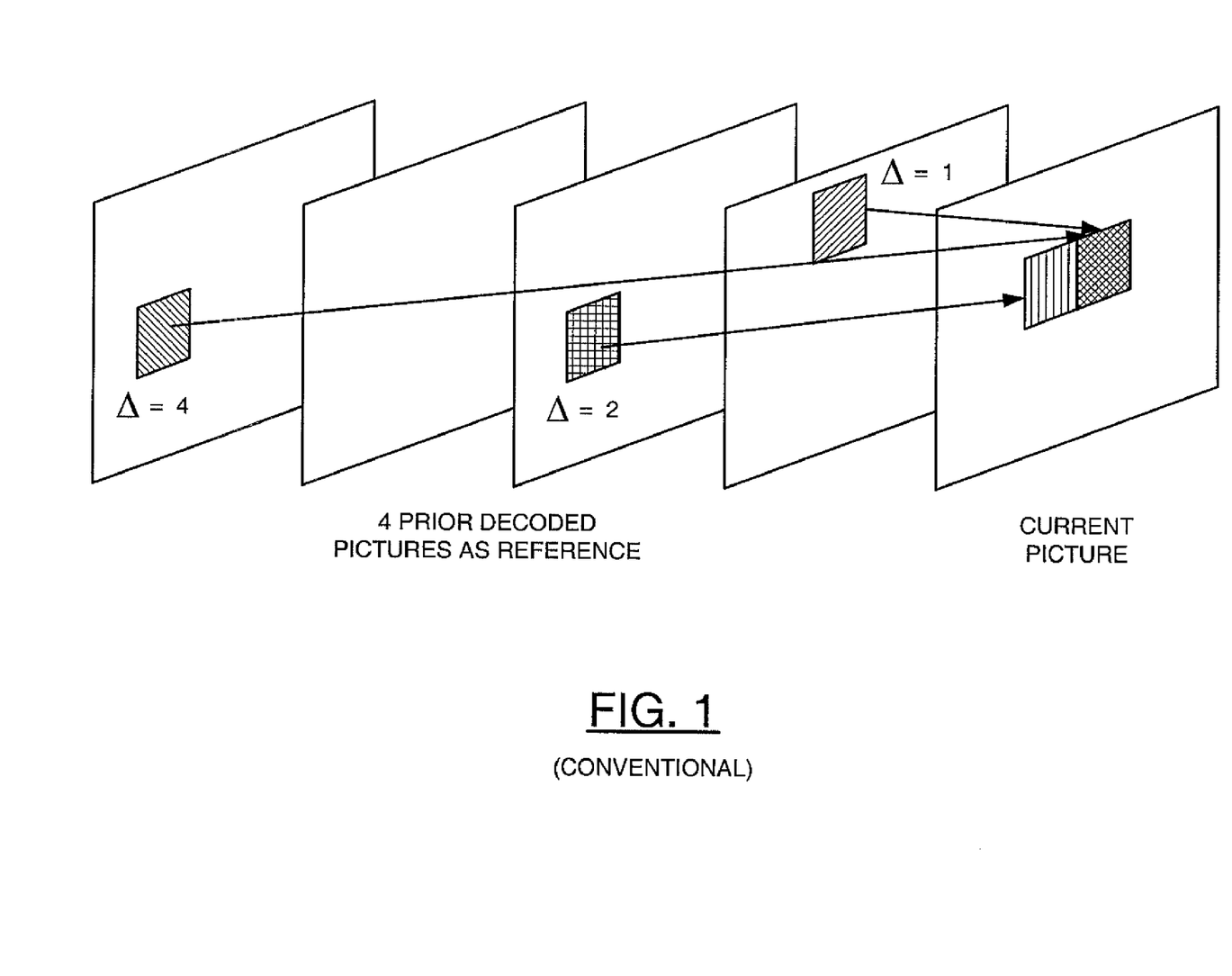
FIG. 1 is a diagram of a conventional H.264 multi-frame inter-prediction.
Figure 2:
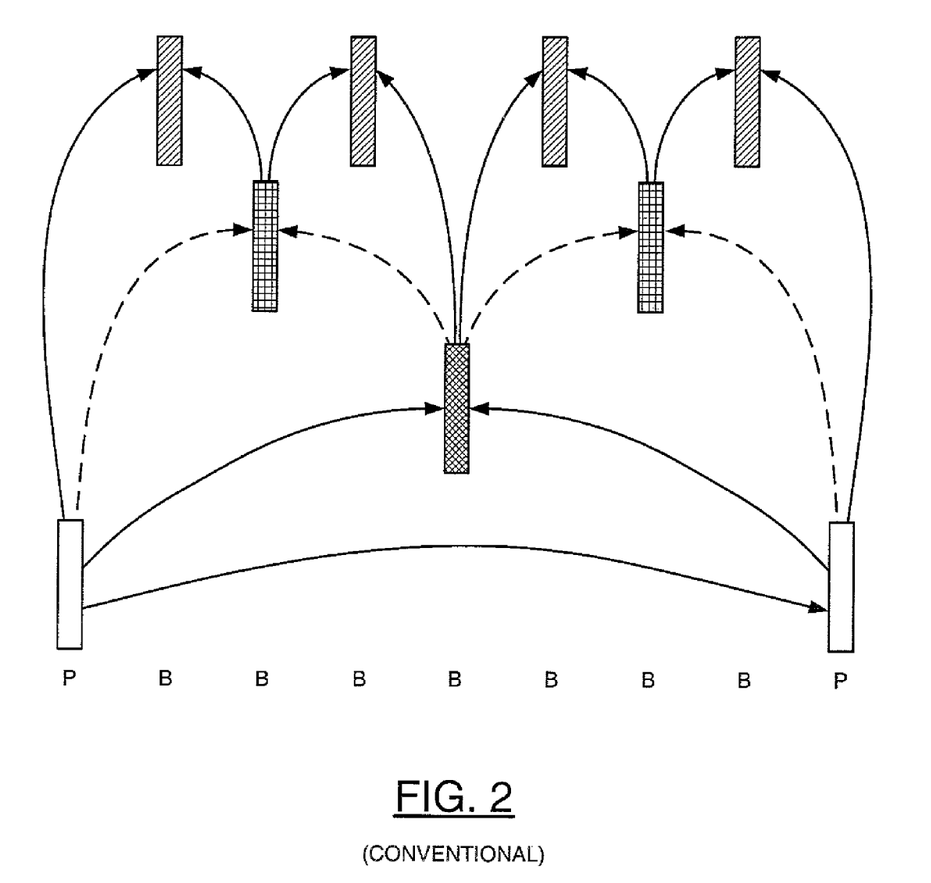
FIG. 2 is a diagram of a conventional H.264 hierarchical group of pictures with reference B-frames.

Referring to FIG. 1, a diagram of a conventional H.264 multi-frame inter-prediction is shown. Referring to FIG. 2, a diagram of a conventional H.264 hierarchical group of pictures (GOP) with reference B-frames is shown. Picture storage memory is the most expensive element of a video decoder. Memory storage increasingly dominates decoder costs. Application memory criteria for H.264 are typically specified to be higher than for other commonly specified codecs, such as ISO MPEG-2 (ITU-T H.262) or Society of Motion Picture and Television Engineers (SMPTE) VC-1 (WMV-9, Microsoft Windows Media 9). The additional memory is used to support H.264 inter-frame predictive coding tools, such as multiple reference frames, hierarchical frames and reference B-frames, as shown in FIG. 1 and FIG. 2.

Picture-storage memory can be reduced by downsampling (i.e., reducing resolution horizontally and/or vertically), as described for MPEG-2. In practice, downsampling may be merged with the final codec block/picture reconstruction stage. For (i) MPEG-2, the IDCT (inverse discrete cosine transform) stage may be used and for (ii) H.264 and VC-1, the in-loop (i.e., de-blocking filters) may be used. Similarly, an efficient implementation may merge the upsample with the sub-pel motion compensated inter-prediction load. For MPEG-2, unlike H.264|MPEG-4/AVC, horizontal sub-sampling by a factor of two with either of the following two simple methods yields good quality: (i) downsample without filtering (i.e., drop alternate columns) and upsample with bilinear interpolation and (ii) downsample by averaging (i.e., adjacent columns) and upsample without filtering (i.e., duplication, sample and hold).

SUMMARY OF THE INVENTION

The present invention concerns a method for reducing memory utilization in a digital video codec. The method generally comprises the steps of (A) generating a second reference picture by downsampling a first reference picture using a pattern, wherein the pattern (i) comprises a two-dimensional grid and (ii) is unachievable by performing a vertical downsampling and separately performing a horizontal downsampling, (B) generating a third reference picture by upsampling the second reference picture and (C) processing an image in a video signal using the third reference picture.

The objects, features and advantages of the present invention include providing a digital video codec that may (i) reduce memory utilization in an H.264|MPEG-4/AVC method/system, (ii) provide better performance compared with conventional techniques, (iii) maintain relatively simple memory access with no bandwidth penalty, (iv) use quincunx patterns for downsampling pictures, (v) use nonlinear upsampling of pictures and/or (vi) use two-stage median upsampling of pictures.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally concerns an H.264|MPEG4-AVC codec implementation with a significantly reduced memory size. The MPEG-4/AVC document may be defined by the Moving Pictures Expert Group, International Organization for Standards, Geneva, Switzerland.

The H.264 document may be defined by the International Telecommunication Union-Telecommunication Standardization Sector, Geneva, Switzerland.

Products with H.264 decoders, transcoders and/or encoders achieving several different price and performance points may be produced using the described techniques. For example, a Blu-ray Disc™ HDTV player using the methods of the present invention, instead of the picture storage reduction techniques used successfully for MPEG-2, may achieve significantly superior subjective quality, while reducing a total system memory (e.g., from 256 megabytes (MB) to 128 MB).

Figure 3:
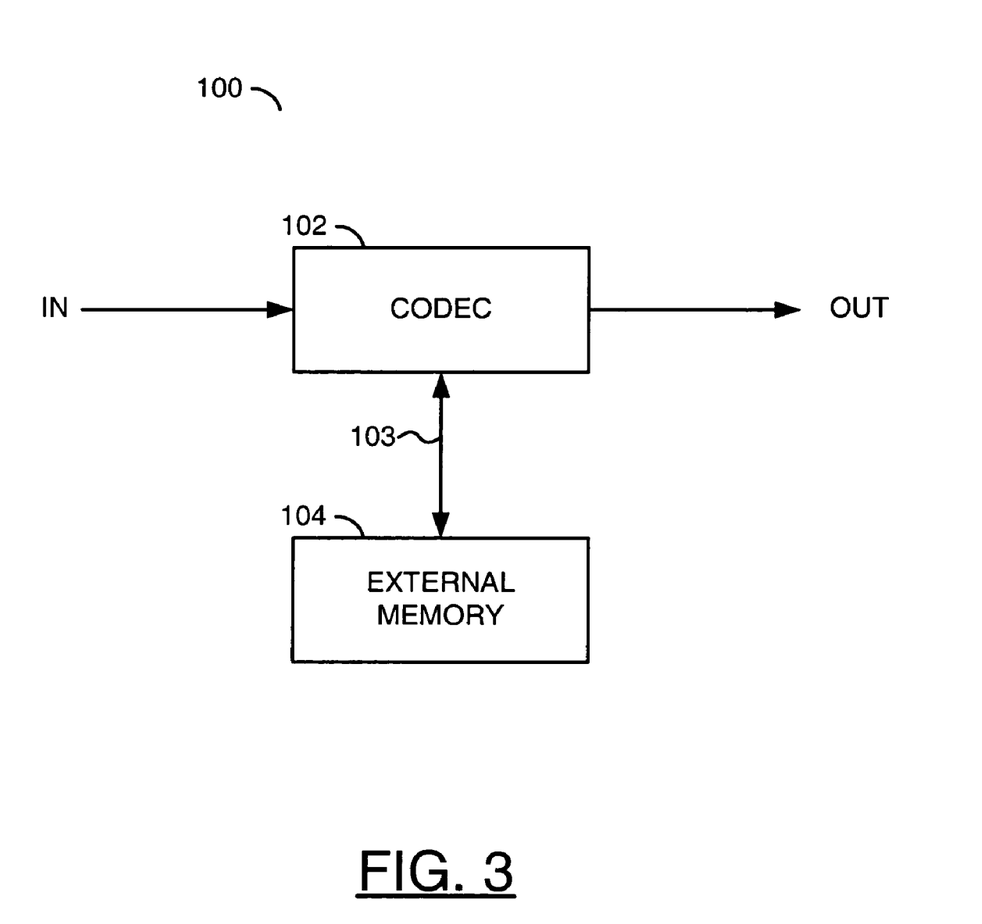
FIG. 3 is a block diagram of a circuit in accordance with a preferred embodiment of the present invention.

Referring to FIG. 3, a block diagram of a circuit 100 is shown in accordance with a preferred embodiment of the present invention. The circuit (or system) 100 may be implemented as a media processor circuit. The circuit 100 generally comprises a circuit (or module) 102, a bus 103 and a circuit (or module) 104. An input signal (e.g., IN) may be received by the circuit 102. An output signal (e.g., OUT) may be generated and presented by the circuit 102. The circuit 102 and the circuit 104 may be in communication with each other via the bus 103 to exchange data. The circuit 100 may implement a digital video encoder, a digital video decoder or a digital video transcoder.

The signal IN may be (i) a compressed video signal (e.g., for decoders and transcoders), generally referred to as a bitstream, or (ii) an uncompressed video signal (e.g., for encoders). The signal IN may comprise a sequence of progressive-format frames and/or interlace-format fields. For decoders and transcoders, the signal IN may be compliant with the H.264 recommendations.

The signal OUT may be (i) one or more analog video signals (e.g., decoder), (ii) one or more digital video signals (e.g., for decoders) or (iii) a compressed bitstream (e.g., for encoders and transcoders). The signal OUT generally comprises a sequence of progressive-format frames and/or interlace-format fields.

Regarding decoders, the signal OUT may include synchronization signals suitable for synchronizing a display with the video information. The signal OUT may be generated in analog form as, but is not limited to, an RGB (Red, Green, Blue) signal, an EIA-770 (e.g., YCrCb) signal, an S-video signal and/or a Composite Video Baseband Signal (CVBS). In digital form, the signal OUT may be generated as, but is not limited to, a High Definition Multimedia Interface (HDMI) signal, a Digital Video Interface (DVI) signal and/or a BT.656 signal. The signal OUT may be formatted as a standard definition signal or a high definition signal. Regarding encoders and transcoders, the signal OUT may be compliant with the H.264 recommendations.

The circuit 102 may be implemented as a video digital signal processor (VDSP) configured as a codec circuit. The circuit 102 may be operational to decode, encode or transcode the video information received in the signal IN to generate the signal OUT. The circuit 102 may be fabricated on a first chip (or die). The bus 103 may be implemented as a memory bus.

The circuit 104 may be implemented as a memory circuit. The circuit 104 may be operational to temporarily buffer frames/fields (pictures or images) and other information used in decoding/encoding/transcoding and formatting the digital video and audio data. A buffering region within the circuit 104 used to buffer decoded pictures/images may be referred to as a decoded picture buffer (DPB). The circuit 104 may be fabricated on a second chip (or die) independently of the first chip and external to the circuit 102.

Sub-sampling drift with MPEG-2, MPEG-4 Part 2 Advanced Simple Profile (ASP), VC-1 and H.264 have been considered. In MPEG-2, an 8×8 intra-coded block of luma (brightness) samples (pixels) may pass through a discrete cosine transform (DCT) to be coded as a de-correlated set of horizontal, vertical and mixed frequencies. A DCT-based de-correlation generally aids compression, as does predictive coding. In MPEG-2, the DC (e.g., average block value) DCT coefficient may be predicatively coded with respect to the DC value of the previously coded block to reduce average bits representing coded blocks.

Similarly, with MPEG-4 Part 2 ASP and VC-1, the prediction modes may be available for intra-coded blocks: (i) block DC, (ii) horizontal DCT coefficients and (iii) vertical DCT coefficients. As with MPEG-2, intra-predictions are generally not formed using reconstructed pixels. By using coded coefficients as predictors, inter-prediction error introduced into a frame from sub-sampled stored reference frames may not be propagate through intra prediction into adjacent intra-coded blocks. Therefore, with the above codecs, a major quality effect due to reference frame sub-sampling may be a loss of sharpness that accumulates over successive inter-predicted frames. Such a prediction "drift" effect is generally limited by periodic I-frames. However, an in-loop de-blocking filter of VC-1 is a potential source of additional error propagation that may cause the simple sub-sampling methods used for MPEG-2 to be less effective.

Figure 4:
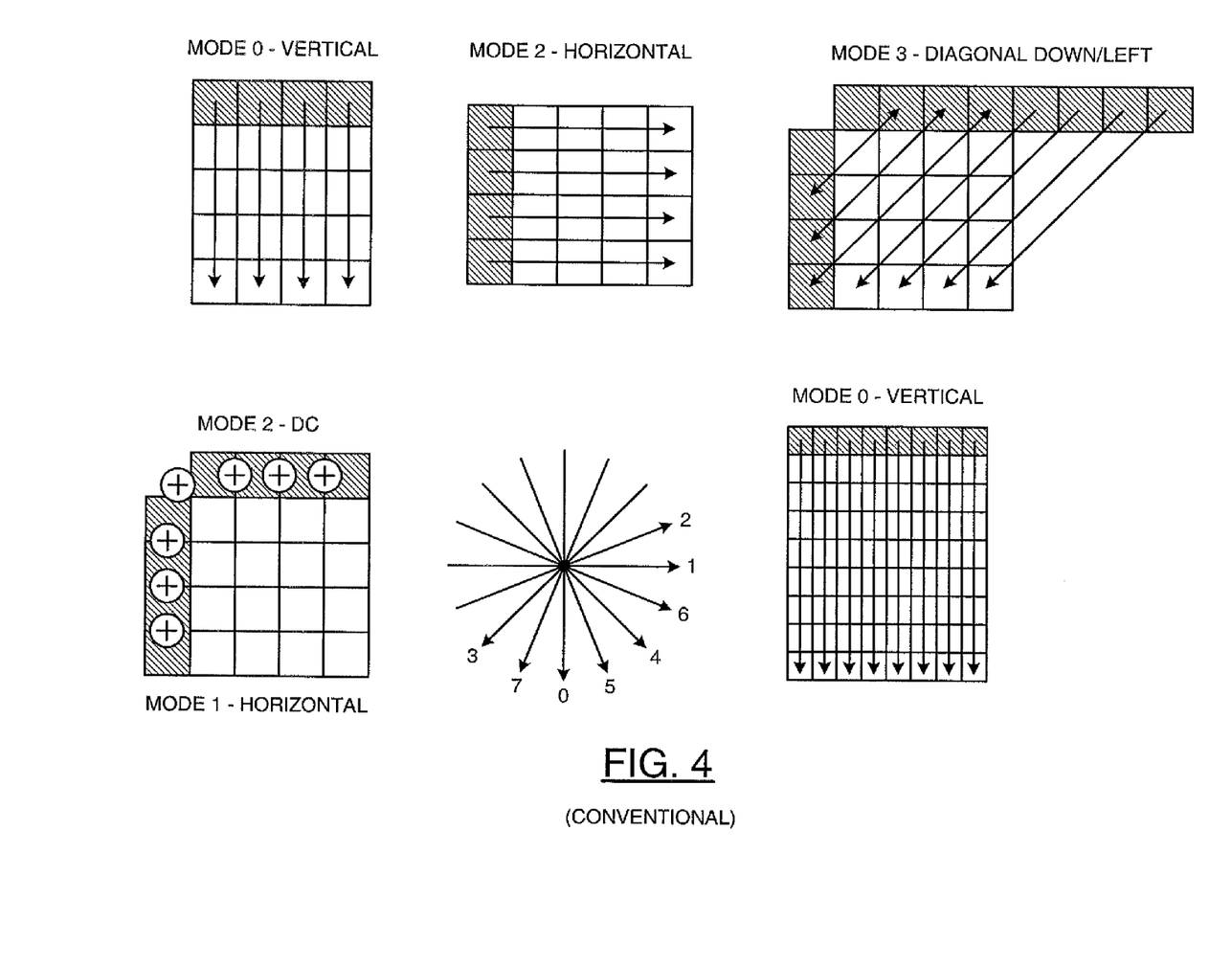
FIG. 4 is a diagram of H.264 multiple intra-prediction modes.

Referring to FIG. 4, a diagram of H.264 multiple intra-prediction modes is shown. Under H.264, intra prediction from adjacent pixels of previously coded blocks generally precede transformation. Nine 4×4 luminance (luma), nine 8×8 luma, four 16×16 luma and four 8×8 chrominance (chroma) directional intra prediction modes may be available, as shown in FIG. 4. If adjacent pixels used for intra prediction differ significantly from the specified values, a resulting error may propagate in a direction of the intra prediction across the block. If a large area of intra-blocks lies adjacent to an inter-predicted block approximated with reference-frame sub-sampling, the approximation error may propagate across the entire area. If the current frame is a reference frame for inter-prediction, the subsequent reference P-frames and reference B-frames may continue to propagate the error. The loop filters in H.264 and VC-1 may cause a similar, although lesser, effect by cumulatively (recursively) propagating pixel values spatially. Since the VC-1 loop filter is generally weaker than the H.264 loop filter (e.g., potentially affects fewer pixels) the in-frame error propagation effect may be further reduced for VC-1.

To mitigate a severity of in-frame propagation of prediction error, significantly more accurate sub-sampling and interpolation is generally specified for H.264 reference pictures and, to a lesser extent, the VC-1 reference pictures. In addition, dynamic buffer management techniques in H.264 may be applied to limit the error.

For MPEG-2, downsampling and upsampling with the simple methods discussed above may be sufficient. In practice, a solution that yields high quality MPEG-2 generally stores reference pictures at half-horizontal resolution by decimating and interpolating only horizontally. For H.264, a few additional options exist for stored luma picture sub-sampling:

Method 1. HHR: half-horizontal with averaging downsampling and duplication upsampling.

Method 2. HHRe: enhanced half-horizontal averaging/duplication. The HHRe method generally includes 8×1 DC (column) differences between each two 8×1 blocks embedded in the seven least significant bits (LSBS) of the 8×1 averaged pixels and the last LSB being the block average LSB. After upsampling, the 8×1 block DCs may be restored and the LSBs loaded with the average LSB.

Method 3. QHR: quincunx downsampling may include unfiltered downsampling and horizontal averaging upsampling.

Method 4. QVR: quincunx downsampling and vertical averaging upsampling in each field.

Method 5. QDR: quincunx downsampling may have four-neighbor horizontal and vertical mean upsampling in each frame.

Method 6. QMR: quincunx downsampling generally includes four-neighbor four-point median upsampling in each frame.

Method 7. QMRi: quincunx downsampling including 4-neighbor four-point median upsampling in each field.

Method 8. QMRa: quincunx downsampling with four-neighbor four-point median upsampling, followed by three-point median with the two horizontal neighbors (to improve vertical detail retention). The QMRa method may be applied to frames or fields for progressive and interlaced sources, respectively.

Figure 5:
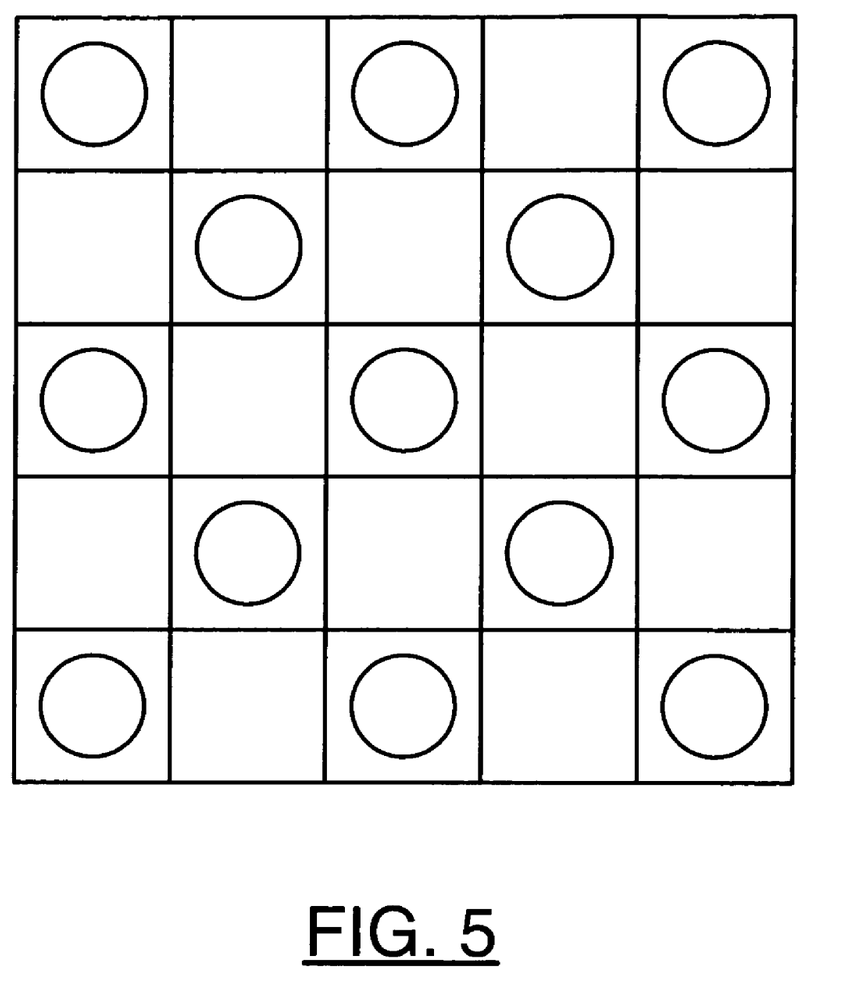
FIG. 5 is a diagram of a quincunx sampling pattern.

Referring to FIG. 5, a diagram of a quincunx sampling pattern is shown. The quincunx pattern may be similar to a "5" spot on a dice/card/domino. Each square generally represents a sample location. Each circle may represent a sample retained by the downsampling. The non-circled positions may be eliminated. A quincunx downsampling generally cannot be created by using a horizontal downsampling and a separate vertical downsampling.

Downsampling of stored pictures with MPEG-2, MPEG-4 Part 2 ASP and/or VC-1 may be relatively straightforward as the stored frames may be reference frames. Furthermore, all stored reference frames are generally of similar significance for forward propagation of errors between frames or fields. For example, excepting proximity to an I-frame, approximation in any stored frame contributes similarly to temporal drift that propagates into future frames.

H.264 generally behaves differently than MPEG-2, MPEG-4 Part 2 ASP and VC-1. With H.264, the decoded picture buffer may be used for both frame-reordering and for storage of reference frames. Furthermore, some reference frames may only propagate errors forward for a very small number of frames, while other reference frames may influence a much larger number. Limited propagation is generally, although not always, a property of the reference B-frames.

Dynamic management of the decoded picture buffer may limit a "worst-case" influence from reducing memory in an H.264 decode. An example set of prioritized rules that may be applied in order until sufficient memory space is freed to store the next decoded field/frame generally follows:

Rule 1: Reduce non-reference pictures first since the non-reference pictures generally cause no temporal on-going drift.

Rule 2: Reduce reference pictures with short (e.g., 1 or 2 pictures in either direction) temporal potential indirect influences on prediction/reconstruction to reduce the temporal duration of drift due to mismatches.

Rule 3: Reduce the "oldest" reference pictures, or the reference pictures that may be temporally furthest from succeeding decoding pictures on the principle that reference pictures that are further away may be used less frequently (in general) for prediction/reconstruction.

Rule 4: Take into account a memory bandwidth and a processing cost of downsizing pictures already present in the memory. If the memory bandwidth and/or processing cycles are scarce, try to reduce pictures that are currently being decoded so that (i) the reconstructed information may be stored at reduced resolution once, rather than (ii) stored at full resolution, read back, reduced in resolution and then written back to the memory. Rule 4 may take precedence over rules 1-3 according to the system bottlenecks. If a memory storage is a main system bottleneck, generally apply rules 1, 2, 3 in order. If one or both of the processing cycles and/or memory bandwidth are the main system bottlenecks, rule 4 may be considered until cycles/bandwidth are within budgets. Other management rules may be implemented to meet the criteria of a particular application. For example, the rules may discard the oldest reference frames, rather than sub-sampling the oldest reference frames.

Figure 6:
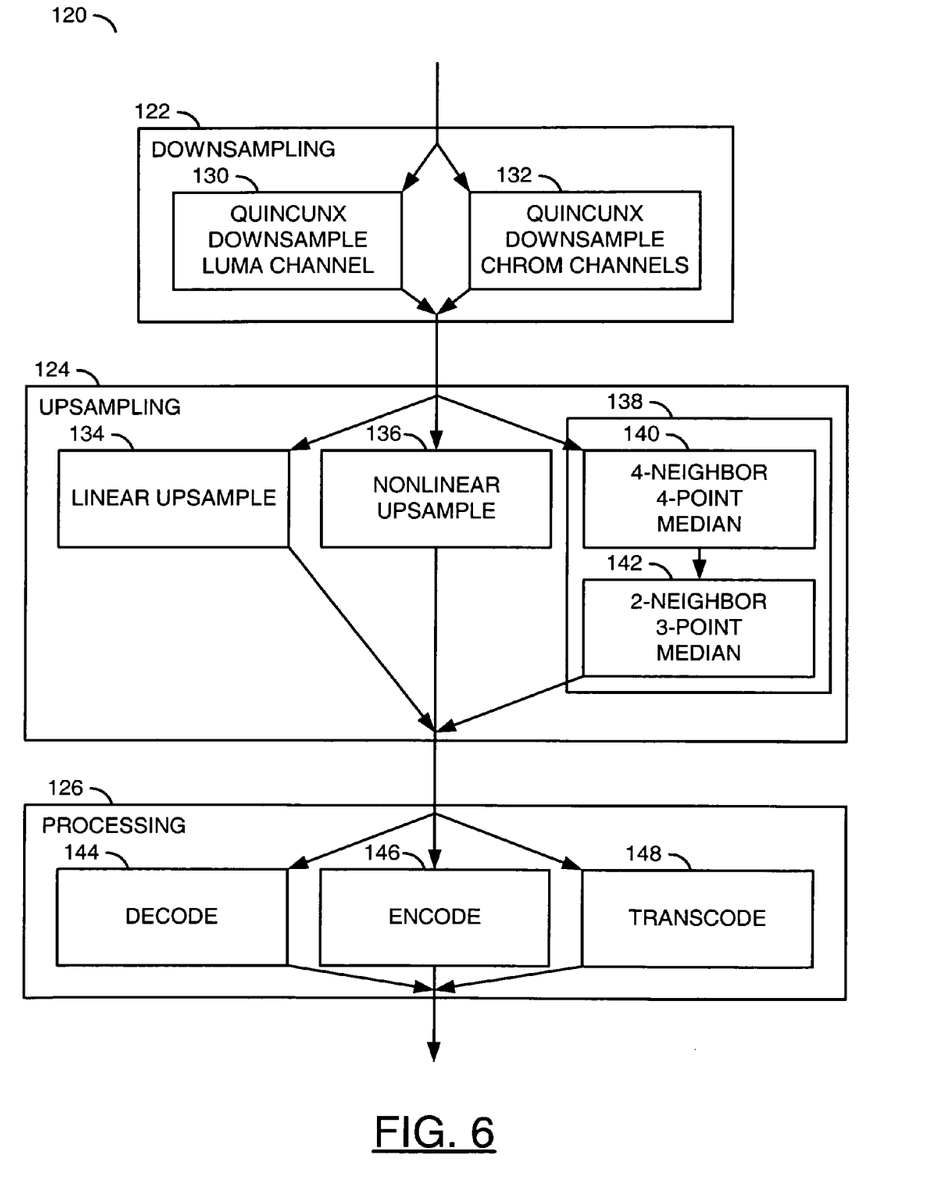
FIG. 6 is a flow diagram of an example method for codec memory reduction.

Referring to FIG. 6, a flow diagram of an example method 120 for codec memory reduction is shown. The method (or process) 120 may implement a reference frame storage process. The method 120 generally comprises a step (or block) 122, a step (or block) 124 and a step (or block) 126. The method 120 may be performed by the circuit 100.

In the step 122, reference frames received through the signal IN may be downsampled to save memory. The downsampling may be in accordance with the above four rules. The downsampling may comprise the QMRa quincunx downsampling (method 8). Other quincunx downsampling options may be implemented to meet the criteria of a particular application.

Generally, the step 122 may comprise a step (or block) 130 and an optional step (or block) 132. In the step 130, luminance (luma) channels of the reference frames may be downsampled. In one or more embodiments, the step 132 may be implemented to downsample both chrominance (chroma) channels of each of the reference frames. The downsampling may be part of a decoding loop.

When a particular reference frame is appropriate for further processing, the particular reference frame may be read from the memory 104 and upsampled to restore an original resolution. The upsampling may be implemented as one or more operations. For example, the upsampling may be implemented as a linear (e.g., an averaging) interpolation in a step (or block) 134. In another example, the upsampling may be implemented as a nonlinear interpolation per a step (or block) 136. The nonlinear interpolation may include, but is not limited to, a four-neighbor four-point median upsampling and a two-neighbor three-point median upsampling. In still another example, the upsampling may be implemented as a two-stage interpolation in a step (or block) 138.

The step 138 generally comprises a step (or block) 140 and a step (or block) 142 forming a first stage and a second stage, respectively. The step 140 may perform the four-neighbor four-point median upsampling to fill a missing sample location. In the step 142, the three-point median upsampling using two horizontal neighbors may be performed to complete the interpolation.

In the step 124, processing of additional pictures received in the signal IN may be performed. The specific processing generally depends on the system being implemented. For example, the step 124 may have a decoding step (or block) 144 for a decoder system wherein the signal OUT is a non-compressed video signal. In an encoder system, the step 124 may have an encoding step (or block) 146. The step 146 generally generates the signal OUT as an encoded bitstream. Furthermore, the step 124 may have a transcoding step (or block) 148 in a transcoder system. The step 148 may generate the signal OUT as an encoded bitstream.

A software H.264 decoder was applied to each of the eight memory downsampling/upsampling methods above for every frame of video luminance in the signal IN. The signal IN was generated as an H.264 video bitstream having with the 4:2:0 chroma format. (The 4:2:0 format generally has chroma samples at half the vertical and horizontal resolution of the luma samples.) No dynamic picture buffer management was used in order not to incur additional bandwidth costs. Instead, all pictures were sub-sampled as the pictures were being decoded. Since block DC artifacts may be much more visually annoying in chroma than in luma and sub-sampling the luma generally saves twice as much memory as sub-sampling the chroma (for the 4:2:0 format), only the luminance component of the reference frames were downsampled. The following publicly available coded H.264 sequences were used for simulation (encoded with a one second group of pictures (GOP) of IBP, no 8×8 Intra/Transform and a QP~[12,26]):

Sequence 1. Ice Age, 1904×1056 pixels, 60 frames/second.
Sequence 2. Warren Miller, 1920×1080 pixels, 60 frames/second.
Sequence 3. Aeon Flux, 1280×720 pixels, 60 frames/second.

The following non-publicly available video sequences were encoded with a JM 10.2H.264 reference encoder:

Sequence 4. Soccer, 704×480i 60 fields/second, was encoded with a half-second GOP of IBBP, a constant QP of 32 and no 8×8 intra mode.
Sequence 5. Mobile Teranex, Parkrun, and Stockholm, 1920×1080i 60 fields/second, was encoded with a five second GOP of IBBP and a constant QP of 32 with all intra modes including 8×8 intra.
Sequence 6. Plateau, 1920×1080i 60 fields/second, was encoded with a one second GOP of IPPP and a constant QP of 32 with all intra modes including 8×8 intra.

The results of each method applied to each sequence were compared with a peak signal to noise ratio (PSNR) clipped to a maximum of 100 decibels (dB), relative to a full reference decode. (PSNR in dB may be computed as $20*\log10(255/RMSE)$, where RMSE may be a root mean squared error.) While the results correspond to a visual ranking, the results generally do not indicate a magnitude of quality differences.

The test results are generally shown in TABLE I below. Data within the TABLE I generally indicates a mean sequence PSNR (dB) for 50% reduction. The mean PSNR may reflect an average quality of an entire sequence. The visual severity and number of severely impaired frames may indicate a visual assessment of the quality.

TABLE I

|  | HHR | HHRe | QHR | QVR | QDR | QMR | QMRi | QMRa |
|---|---|---|---|---|---|---|---|---|
| Ice Age | 45.5 | 46.0 | 49.0 | 49.5 | 51.4 | 53.3 | 51.0 | 53.5 |
| Warren Miller | 36.9 | 40.7 | 38.9 | 42.2 | 41.2 | 43.9 | 41.6 | 43.9 |
| Aeon Flux | 49.1 | 45.9 | 50.9 | 46.9 | 48.6 | 54.6 | 52.1 | 54.6 |
| Soccer | 26.8 | 36.5 | 34.2 | NA | NA | NA | 34.1 | 35.2 |
| Mobile | 23.6 | 26.2 | 24.4 | 25.4 | 24.9 | 27.6 | 26.3 | 26.8 |
| Plateau | 31.3 | 35.4 | 33.8 | NA | NA | NA | 33.8 | 34.3 |
| Parkrun | 21.0 | 23.3 | 25.5 | NA | NA | NA | 23.8 | 24.8 |
| Stockholm | 23.8 | 28.5 | 28.0 | NA | NA | NA | 24.8 | 26.4 |

Several visual assessments of the simulations generally follow:

Assessment 1. HHR: jagged diagonals, quite blurry, significant and frequent blocking artifacts, particularly in background/flat regions.
Assessment 2. HHRe: all aspects may be somewhat improved, most noticeably blocking. A significant increased memory bandwidth was used for motion compensated prediction. All 8×1 blocks containing appropriate data were accessed to reconstruct the full-resolution data.
Assessment 3. QHR: all quincunx sampling methods may be significantly better than the method HHR in all respects. The method QHR generally has unique jagged weaving artifacts that may be visually unpleasant.
Assessment 4. QVR: somewhat better than the method QHR, but has similar (although vertical) weaving artifacts.
Assessment 5. QDR: generally less sharp and also has more artifacts than the method QMR.
Assessment 6. QMR: a good option for progressive sequences. The method QMR may be worse than the method QMRi on interlaced sequences.
Assessment 7. QMRi: a good option for most interlaced content. However, the method QMRi may not be as good as the method QMR on progressive sequences. The method QMRi may have a disadvantage, relative to QHR, that thin horizontal lines may be broken or attenuated.
Assessment 8. QMRa: the best practical option for all content. Despite similar PSNR to the other preceding methods on interlaced sequences, the method QMRa usually appears superior due to fewer gross artifacts at the expense of some fine detail distortion/loss. An exception may be that the method HHRe (and the method QHR to a lesser extent) generally appears superior to the method QMRa on detailed long GOP sequences without frequent I-blocks (such as simple pans in Mobile and Plateau). While the method HHRe may introduce more block artifacts and vertical streaking (from the 1×8 block operations), the method HHRe generally retains more detail. Retaining high vertical detail in panning interlaced sequences may be particularly important for preventing blurring. The method QMRa was generally conceived to improve preservation of high frequency vertical details. The method QMRa may be implemented as a two-step cascaded median with the second stage three-point median re-introducing the horizontal neighbors. For the sequences that improved with the method HHRe, a marked improvement was usually noted for the method QMRa relative to the method QMR and the method QMRi. Furthermore, an overall benefit was generally noted on all tested sequences.

Figure 7:
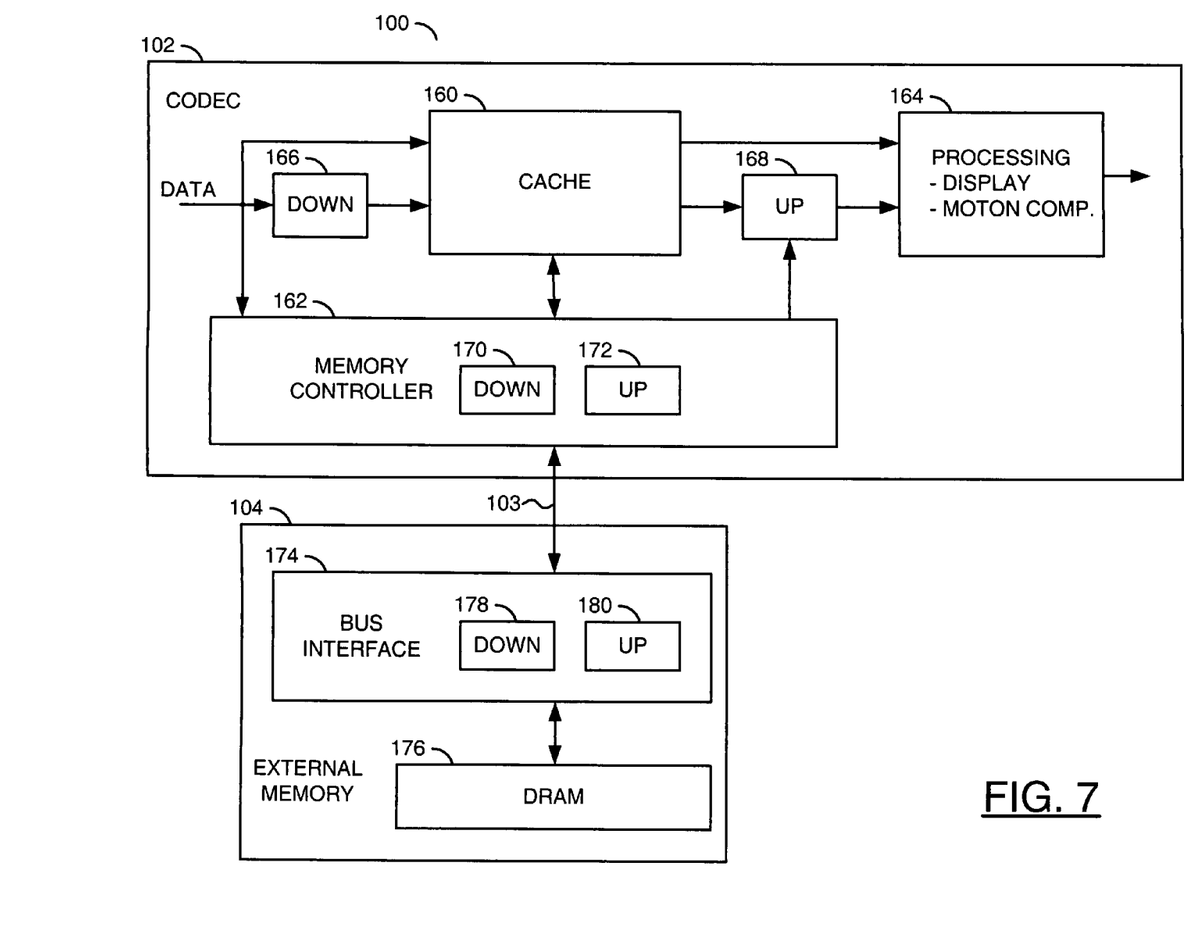
FIG. 7 is a detailed block diagram of an example architecture of the system.

Referring to FIG. 7, a detailed block diagram of an example architecture of the circuit 100 is shown. The circuit 102 generally comprises a circuit (or module) 160, a circuit (or module) 162 and a circuit (or module) 164. The circuit 102 may further comprises an optional block (or function) 166 and an optional block (or function) 168. The block 162 may comprise an optional block (or function) 170 and an optional block (or function) 172. The circuit 104 generally comprises a circuit (or module) 174 and a circuit (or module) 176. The circuit 174 may comprise an optional block (or function) 178 and an optional block (or function) 180.

The circuit 160 may be implemented as a cache memory. The circuit 160 is generally operational to buffer picture data. Depending on the storage capacity of the circuit 160, the data may range from a few macroblocks to one or more macroblock rows, one or more fields or one or more frames.

The circuit 162 may be implemented as a memory controller. The circuit 162 generally controls reading and writing data to and from the circuit 104 via the bus 103. The circuit 162 may be in communication with the circuit 160 to exchange data between the circuit 160 and the circuit 104.

The circuit 164 may be implemented as a processing circuit. The processing may include, but is not limited to, display processing (e.g., a video output module), motion compensation processing, encoding, decoding, transcoding and the like. The circuit 164 may be in communication with the circuit 160 to receive cached data. The circuit 164 may be in communication with the circuit 162 to receive buffered data read from the circuit 104.

The circuit 174 may be implemented as a bus interface circuit. The circuit 174 is generally operational to communicate on the bus 103 and transfer data between the bus 103 and the circuit 176.

The circuit 176 may be implemented as a dynamic random access memory (DRAM). The circuit 176 generally performs the actual storage of the data received via the bus 103. The circuit 176 may be implemented as a single data rate (SDR) dynamic random access memory (DRAM) or a double data rate (DDR) DRAM. Other memory technologies may be implemented to meet the criteria of a particular application.

Quincunx downsampling is generally performed during a store operation of the picture data to memory by the circuit 102. The store operation may be implemented as a store-strip command and/or a write-to-RAM command. The uncompressed picture may be a reference field/frame or a non-reference field/frame. Generally, the downsampling may be applied to all fields/frames stored for either display order re-ordering and/or for use as reference fields/frames.

The downsampling may be performed in one or more locations within the circuit 100 prior to completion of the store operation, based on a particular application. For example, data may be downsampled by the block 164 prior to caching in the circuit 160. In another example, downsampling may be performed in the circuit 162 shortly before the data is transferred across the bus 103, as illustrated by the block 170. In still another example, data received at the circuit 174 from the bus 103 may be downsampled by the block 178 prior to buffering in the circuit 176.

Typically, the store operation may be for one or more uncompressed macroblocks at a time, one or more macroblock rows at a time, an entire field or an entire frame. The data is generally written to the circuit 160 first and subsequently transferred to the circuit 176. Depending on the storage capacity of the circuit 160, the data may be written just to the circuit 160, without the transfer to the circuit 176. If the circuit 160 is of an intermediate in storage capacity, a row of macroblocks may be cached in the circuit 160 before copying to the circuit 176.

Non-linear upsampling is generally performed during a read operation of a picture from memory. The read operation may be implemented as a read-strip command, a load-motion-compensated-block command and/or a read-from-RAM command. The upsampling may be performed in one or more locations in the circuit 100. For best efficiency, the upsampling is usually performed within the circuit 102. For example, data read from the circuit 160 may be upsampled by the block 168. In another example, data just received from the bus 103 may be upsampled by the block 172. The circuit 174 may also implement upsampling. For example, the upsampling may be performed by the block 180 prior to placing the data on the bus 103.

Several conditions generally utilize the upsampling operation. In a first condition, the upsampling may be performed during read operations of reference fields/frames prior to any motion compensated interpolation used for decoding/reconstructing other blocks/macroblocks. In a second condition, upsampling may be performed as part of generating a displayable-format video signal. Other upsampling conditions may be implemented to meet the criteria of a particular application. Generally, data read from memory (e.g., circuit 160 and/or circuit 176) may be upsampled prior to processing by the circuit 164.

Figure 8:
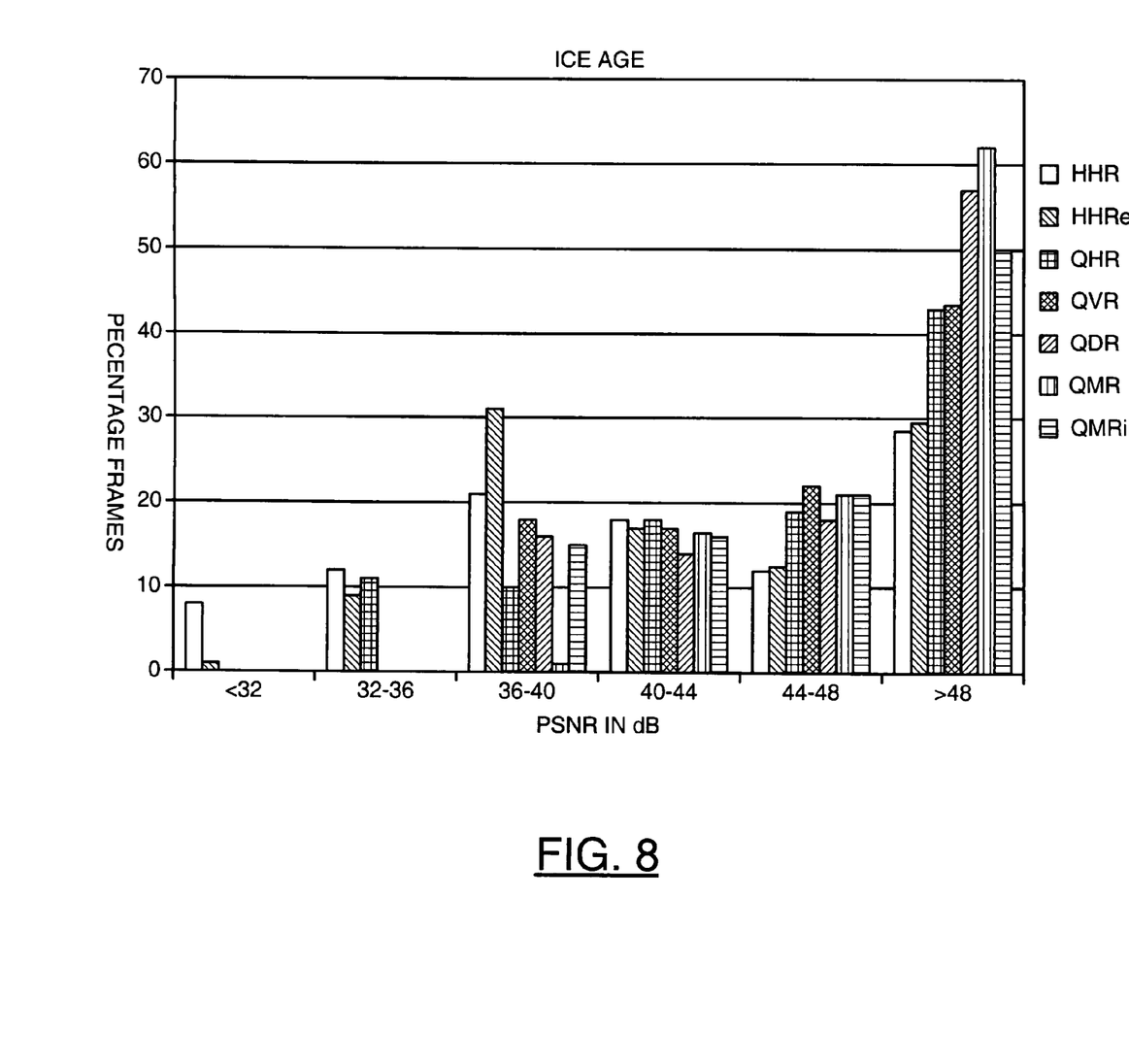
FIG. 8 is a histogram of frame peak signal to noise ratios in an Ice Age sequence.

Referring to FIG. 8, a histogram of frame peak signal to noise ratios in the Ice Age sequence is shown. From TABLE I, the method HHR may result in approximately 10% extremely poor quality frames (<32 dB). The methods HHR, HHRe and QHR may also have approximately 10% poor frames (32-36 dB). All options, except the method QMR, generally have approximately 10% or more somewhat impaired frames (36-40 dB). Other frames (>40 dB) are generally visually acceptable. In particular, the method QMR may yield visually acceptable high definition decode quality on the Ice Age clip.

Quincunx pixel downsampling (sub-sampling) along with median upsampling may reduce in half a storage criteria of luma samples for H.264 decoding. The quincunx pixel downsampling generally yields quality consistently superior (up to nearly 10 dB PSNR) to traditional horizontal and/or vertical downsampling and interpolation. A two-stage cascaded median upsampling may further improve quality, particularly for highly detailed panning interlaced sequences that benefit from improved vertical detail. Additionally, in contrast to block or segment-based memory compression methods, memory bandwidth is reduced and memory access is not significantly complicated with simple sub-sampling methods such as the quincunx.

The function performed by the diagrams of FIGS. 3, 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:
1. A circuit comprising:
  a bus module configured to (i) receive a first picture of a video signal from a bus, (ii) generate a second picture by downsampling said first picture using a quincunx pattern, (iii) generate a third picture by upsampling said second picture using a nonlinear interpolation and (iv) place said third picture on said bus, wherein said upsampling comprises (i) a first stage four-neighbor, four-point median upsamplinq and (ii) a second stage two-neighbor, three-point median upsampling; and
  a memory configured to buffer said second picture.

2. The circuit according to claim 1, wherein said video signal is utilized in a digital video codec comprises an encoding.

3. The circuit according to claim 2, wherein said digital video codec is compliant with at least one of (i) an H.264 recommendation and (ii) an MPEG-4/Advanced Video Coding recommendation.

4. The circuit according to claim 1, wherein said downsampling is applied to a luminance channel and two chrominance channels of said first picture.

5. The circuit according to claim 1, wherein said video signal is utilized in a digital video codec comprises a decoding.

6. The circuit according to claim 1, further comprising a memory controller configured to transfer said first picture to said bus module via said bus.

7. The circuit according to claim 6, wherein (i) said memory controller is formed on a first chip and (ii) said memory is formed on a second chip.

8. The circuit according to claim 1, further comprising a memory controller configured to (i) receive said third picture from said bus module via said bus.

9. The circuit according to claim 1, further comprising a video output module configured to format said third picture for display.

* * * * *